United States Patent

[11] 3,632,108

| [72] | Inventor | James Mark Wilson<br>4149 Regal Oak Drive, Encino, Calif.<br>91316 |
|---|---|---|
| [21] | Appl. No. | 796,113 |
| [22] | Filed | Feb. 3, 1969 |
| [45] | Patented | Jan. 4, 1972 |

[54] ILLUSORY APPARATUS
9 Claims, 5 Drawing Figs.

[52] U.S. Cl. .................................................. 272/13,
272/8 M
[51] Int. Cl. ...................................................... A63j 5/00
[50] Field of Search .......................................... 272/13, 8,
10, 9, 8.5, 25; 40/28 B

[56] References Cited
UNITED STATES PATENTS

| 872,305 | 11/1907 | Purpura.......................... | 272/25 |
| 2,155,767 | 4/1939 | Pfannekuchen.............. | 272/13 |
| 2,607,142 | 8/1952 | Lee ................................. | 272/13 X |

FOREIGN PATENTS

| 13,705 | 1913 | Great Britain................ | 272/9 |
| 9,588 | 1914 | Great Britain................ | 272/9 |
| 443,668 | 3/1936 | Great Britain................ | 272/13 |

*Primary Examiner*—Anton O. Oechsle
*Assistant Examiner*—Arnold W. Kramer
*Attorney*—Herzig & Walsh

ABSTRACT: The device or apparatus of the invention is one for use in a magical display which in a preferred form of the invention provides for undetectable concealment of an object or person. The apparatus comprises angularly positioned mirrors for concealing a space, the mirrors being associated with a spherical surface so arranged that the image reflected in the mirrors gives the appearance of a complete circular surface thereby creating the illusion of a vacant space behind the mirrors. The effect is enhanced by a symmetrical arrangement of sections of small spheres or balls including two ball sections having flat surfaces placed against the mirrors, and two other ball sections positioned to make it appear that four similar ball sections are symmetrically positioned relative to the spherical surface in space including that concealed behind the mirrors.

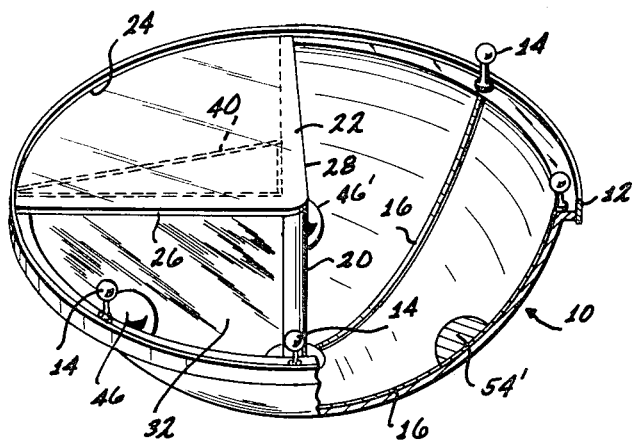
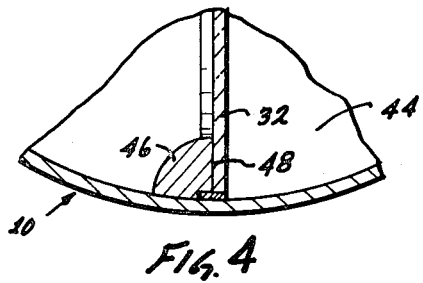
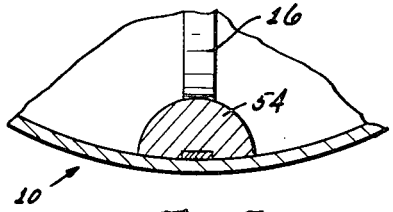
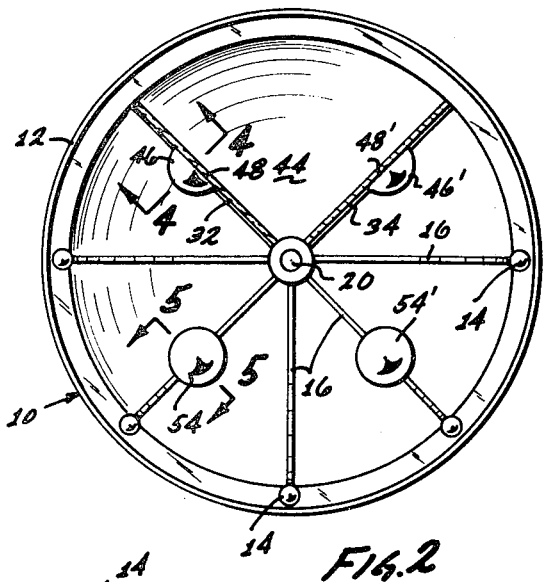
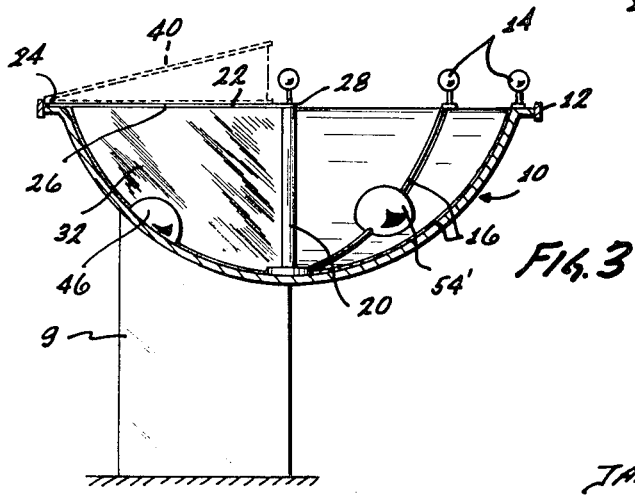
INVENTOR
JAMES MARK WILSON

ILLUSORY APPARATUS

SUMMARY OF THE INVENTION

The invention relates to an apparatus for producing magical effects or illusions particularly by way of novel and unique use of mirrors for concealment. In a preferred form of the invention constituting an exemplary form described in detail herein, the invention takes the form of a partial sphere or dome shape including a portion in which an object, or person, can be undetectably concealed. The display or illusion is created or effected by way of a unique and novel arrangement of mirrors whereby a space within the partial sphere is concealed by the effect or appearance is that the said space is vacant.

In the preferred form of the invention mirrors are used in a V-configuration to conceal the space behind them, in a unique and novel way which makes it appear that the space concealed by the mirrors is simply a continuation of adjacent structure, the image of which is reflected in the mirrors. In a preferred form of the invention a structure is used which is a section or part of a sphere or globe which may be a hemisphere. The mirrors are positioned at an angle to each other and are arranged to lie along radii of a section of the sphere so that the exposed interior surfaces of the section of the sphere are reflected in the mirrors, thus making it appear and giving the illusion that the entire interior part of the said section of the sphere is vacant and unoccupied rather than the space behind the mirrors being concealed. The desired effect is greatly enhanced by way of further means associated with the partial sphere and mirrors. Sections of small spheres or balls having a flat side are placed against the mirrors and adjacent portions of the spherical surface. These are half sections, so with their mirror images that appear to be full sections extending into the concealed space. Then other "full" section spheres or balls are symmetrically positioned to give the effect and impression of a group of four (for example) similar objects symmetrically positioned relative to the spherical surface.

The section of the sphere as referred to is preferably positioned in the display so that its interior can be viewed. The upper part of the space concealed by the mirrors is enclosed at the top, and means of access to and from the enclosed space may be provided from the top or through a rear portion of the partial sphere.

In accordance with the foregoing the primary object of the invention is to provide a unique and novel magical display or illusion device whereby an interior space is effectively and undetectably concealed from view for hiding or concealing an object or person.

Another object is to provide a magical display as set forth wherein the illusion or effect is secured by way of a novel arrangement of mirrors within the structure having a surface which is reflected in the mirrors that the interior space behind the mirrors is vacant and unoccupied.

Another object is to provide a structure as set forth in the foregoing provided particularly, by way of a section of a sphere having mirrors arranged in it along radii whereby to reflect the interior surfaces of the section of the sphere and to enclose the space behind the mirrors, and with a group of objects, preferably sections of spheres symmetrically arranged relative to the spherical surface and mirrors to create the illusion that the entire space within the spherical surface is vacant.

Further objects and additional advantages of the invention will become apparent from the following detailed description and annexed drawings: wherein:

FIG. 1 is a perspective view of a preferred form of the invention;

FIG. 2 is a plan view of the device of FIG. 1;

FIG. 3 is a transverse sectional view of the device of FIG. 1 and 2;

FIG. 4 is sectional view taken along the line 4—4 of FIG. 2;

FIG. 5 is a sectional view taken along the line 5—5 of FIG. 2.

Referring now more in detail to the various figures of the drawings the display may be supported in an oriented position as shown in FIG. 1 or FIG. 3 such as by way of pedestal or stand 9. Numeral 10 designates a section of sphere or globe which may be substantially a hemisphere or less than a hemisphere. This apparatus may be made from any suitable material such as metal or otherwise having a smooth interior surface, and an edge rim as designated at 12 along which equally angularly spaced electric light bulbs as designated at 14 are provided. Along the inside surface of the section of sphere 10 there are angularly spaced radial ribs 16 which may be strips of metal or these ribs may be in the form of fluorescent light tubes.

At the center axis of the section of sphere 10 is a center post 20 that may be made of any suitable material. At the end of the post 20 is one corner of a generally triangularly shaped platform or cover 22 one side of which as designated at 24 is arcuate and which is contiguous with the circumference of the section of sphere 10 as shown.

The platform 22 has side edges as designated at 26 and 28. Numeral 32 designates a first mirror lying in a radial plane in an area bounded along one edge by the center post 20; along an upper edge by the edge 26 of the platform 22 and along a further edge by the interior surface of the section of sphere 10, this edge preferably lying along one of the radial ribs 16. Numeral 34 designates a similar mirror positioned in a radial plane the edges being bounded by the post 20; the edge 28 of the platform 22 and the interior surface of the section of sphere 10.

With respect to the structure as so far described, preferably but not necessarily the section of sphere 10 is supported in a position as may be seen in the figures such that the audience or spectators can see the inside of the section of sphere 10. The platform 22 is normal to the axial post 20. Numeral 40 designates a further enclosure or structure which may be supported over platform 22 providing means such as trapdoor or opening for access to and from the concealed space. Similarly an access opening or trapdoor providing access to the concealed space may be provided at the back of the sphere section 10. The structure 40 is representative of any suitable housing, enclosure passageway, or tunnel or the like that can be associated with sphere section 10 to provide access to and from the concealed space, the invention residing in the manner of effecting the concealment.

From the foregoing it will be observed that the mirrors 32 and 34 conceal space behind them as designated at 44 which space could be occupied by a person or object utilized in performing an illusion or magical display.

Numeral 46 designates a small section of sphere or ball made of a suitable polished material. It has a flat side 48 positioned against mirror 32 and a rounded surface on the bottom side shaped to contiguously fit against the spherical surface of dome 10. Numeral 46' designates a similar ball section symmetrically positioned against mirror 34. The reflections or images of these ball sections in the mirrors makes it appear that these are two substantially half-sphere or half-ball sections symmetrically disposed against the spherical surface 10.

Numeral 54 designates a section which is substantially half of a ball or sphere having a curved or spherical bottom side symmetrically positioned against the spherical surface 10 at a position as shown and numeral 54' designates another similar ball section symmetrically positioned in the next adjacent quadrant of the spherical surface 10. Thus, with the mirror reflections the appearance is that of four spheres or balls position against the spherical surface 10 and symmetrically arranged, the effect being that the space enclosed is vacant rather than one quadrant being concealed. Thus the device serves to undetectably conceal the space within the quadrant under platform 44. Many types of displays and illusions are possible in which the described device serves as a part with an object or person concealed in the space behind the mirrors and then made to appear, disappear, or otherwise.

From the foregoing those skilled in the art will understand the nature and construction of the invention and the manner in which it achieves its purposes. The interior surface of the section of sphere 10 is generally smooth and unobstructed and the image of this surface is reflected in the mirrors 32 and 34. The section of sphere 10 is, of course, symmetrical. With the mirrors in the position shown concealing the space 44 the images reflected in them make it appear that the interior surface of the section of the sphere is continuous, that is, that the space underneath the platform 22 is simply a vacant unoccupied continuation of the part of section of sphere 10 which is reflected in the mirrors. In other words the viewer appears to see simply a vacant space underneath the platform 22. The effect is heightened by reason of the position of the section of sphere 10 so that the viewers can see the interior of it and thus distinctly see reflections of the interior in the mirrors 32 and 34. It will be observed that the geometrical relationship of the mirrors 32 and 34 to the interior surface of the section of sphere 10 is such that they cannot reflect any images except interior surfaces of the section of sphere and due to the symmetry of the images, particularly the images of the ball sections reflected, the distinct impression is created that nothing is concealed. The effect is further improved by reason of the lighting arrangement consisting of the symmetrical and equally angularly spaced lighting bulbs 14 around the circumference of the section of sphere and the angular ribs 16 which assist in obscuring or concealing the edges of the mirrors 32 and 34 that engage the spherical surface of the section 10.

From the foregoing those skilled in the art will understand the nature and construction of the invention and the manner in which it achieves and realizes all of the objects and advantages as set forth in the foregoing as well as the many additional advantages that are apparent from the detailed description.

The foregoing disclosure is representative of a preferred form of the invention and is to be interpreted in an illustrative rather than a limiting sense, the invention to be accorded the full scope of the claims appended hereto.

What is claimed is:

1. Illusory apparatus comprising an upwardly facing concave curved surface having a continuous top edge; a substantially sector shaped platform having its curved edge joined to a portion of the top edge of said curved surface, the other edges of said platform spaced from and overlying a portion of said curved surface; mirrors upstandingly mounted on said curved portion, the top portions of said mirrors supporting the other edges of said platform, said mirrors, platform and curved portion forming a concealment space; and means positioned on said curved surface exteriorly of said concealment space and symmetrically positioned relative to said mirrors to create the illusion when viewed together with the reflected curved surface that the concealed space below said platform is not present and that only the platform overlies said curved portion.

2. Apparatus as in claim 1 wherein the said curved surface comprises a portion of a sphere, said mirrors being positioned so that the reflection therein is an image giving the appearance of a continuation of said portion of the sphere with the space behind the mirrors concealed.

3. An apparatus as in claim 2 wherein the said mirrors are positioned at an angle to each other and radially with respect to the said portion of the sphere.

4. An apparatus as in claim 3 including means for supporting the said portion of a sphere in a position so that the interior surface of it can be viewed, and means providing for access to the said concealment space.

5. An apparatus as in claim 1 wherein said symmetrically positioned means comprises at least one object having a flat surface placed against the mirror so that the object and its mirror image appears to be a single object having a part extending into the mirror surface.

6. An apparatus as in claim 5 wherein said symmetrically positioned means comprises at least two of said objects placed against said mirrors and at least two other objects having a shape corresponding to the shape of the one of the first objects and its image in a mirror.

7. An apparatus as in claim 5 wherein said object is a section of a sphere.

8. An apparatus as in claim 6 wherein all of said objects are sections of spheres.

9. An apparatus as in claim 5 wherein said curved surface comprises a section of a sphere said mirrors being positioned so that the reflection therein is an image giving the appearance of a continuation of said portion of the sphere.

* * * * *